(12) United States Patent
Rosenblatt et al.

(10) Patent No.: US 7,928,965 B2
(45) Date of Patent: Apr. 19, 2011

(54) TOUCH SCREEN RFID TAG READER

(75) Inventors: Michael Nathaniel Rosenblatt, Campbell, CA (US); Steve Porter Hotelling, San Jose, CA (US)

(73) Assignee: Apple Inc., Cupertino, CA (US)

( * ) Notice: Subject to any disclaimer, the term of this patent is extended or adjusted under 35 U.S.C. 154(b) by 692 days.

(21) Appl. No.: 11/965,560

(22) Filed: Dec. 27, 2007

(65) Prior Publication Data
US 2009/0167699 A1 Jul. 2, 2009

(51) Int. Cl.
*G06F 3/041* (2006.01)
*G08B 13/14* (2006.01)
(52) U.S. Cl. .......... 345/173; 178/18.03; 340/572.7; 340/572.8; 455/566; 369/1
(58) Field of Classification Search .......... 345/156–178
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,380,930 B1 | 4/2002 | Van Ruymbeke | |
| 6,690,387 B2 | 2/2004 | Zimmerman et al. | |
| 7,015,894 B2 | 3/2006 | Morohoshi | |
| 7,113,088 B2 | 9/2006 | Frick et al. | |
| 7,184,064 B2 | 2/2007 | Zimmerman et al. | |
| 7,307,625 B2 | 12/2007 | Kurashima et al. | |
| 7,663,607 B2 | 2/2010 | Hotelling et al. | |
| 2004/0233172 A1* | 11/2004 | Schneider et al. | 345/168 |
| 2006/0026521 A1 | 2/2006 | Hotelling et al. | |
| 2006/0055531 A1 | 3/2006 | Cook et al. | |
| 2006/0097991 A1 | 5/2006 | Hotelling et al. | |

(Continued)

FOREIGN PATENT DOCUMENTS

| | | |
|---|---|---|
| JP | 2000-163031 A | 6/2000 |
| JP | 2002-342033 A | 11/2002 |
| WO | WO-2009/085777 A2 | 7/2009 |

OTHER PUBLICATIONS

International Search Report mailed Dec. 9, 2009, for PCT Application No. PCT/US2008/087039, filed Dec. 16, 2008, two pages.

(Continued)

*Primary Examiner* — Amare Mengistu
*Assistant Examiner* — Jennifer Zubajlo
(74) *Attorney, Agent, or Firm* — Morrison & Foerster LLP

(57) ABSTRACT

The efficient incorporation of RFID circuitry within touch sensor panel circuitry is disclosed. The RFID antenna can be placed in the touch sensor panel, such that the touch sensor panel can now additionally function as an RFID transponder. No separate space-consuming RFID antenna is necessary. Loops (single or multiple) forming the loop antenna of the RFID circuit (for either reader or tag applications) can be formed from metal on the same layer as metal traces formed in the borders of a substrate. Forming loops from metal on the same layer as the metal traces are advantageous in that the loops can be formed during the same processing step as the metal traces, without requiring a separate metal layer.

27 Claims, 7 Drawing Sheets

U.S. PATENT DOCUMENTS

| | | | |
|---|---|---|---|
| 2006/0197753 A1 | 9/2006 | Hotelling | |
| 2007/0057793 A1* | 3/2007 | Alden | 340/572.1 |
| 2008/0143683 A1 | 6/2008 | Hotelling | |
| 2008/0158172 A1 | 7/2008 | Hotelling et al. | |
| 2008/0165139 A1 | 7/2008 | Hotelling et al. | |
| 2008/0165158 A1 | 7/2008 | Hotelling et al. | |
| 2008/0309633 A1 | 12/2008 | Hotelling et al. | |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

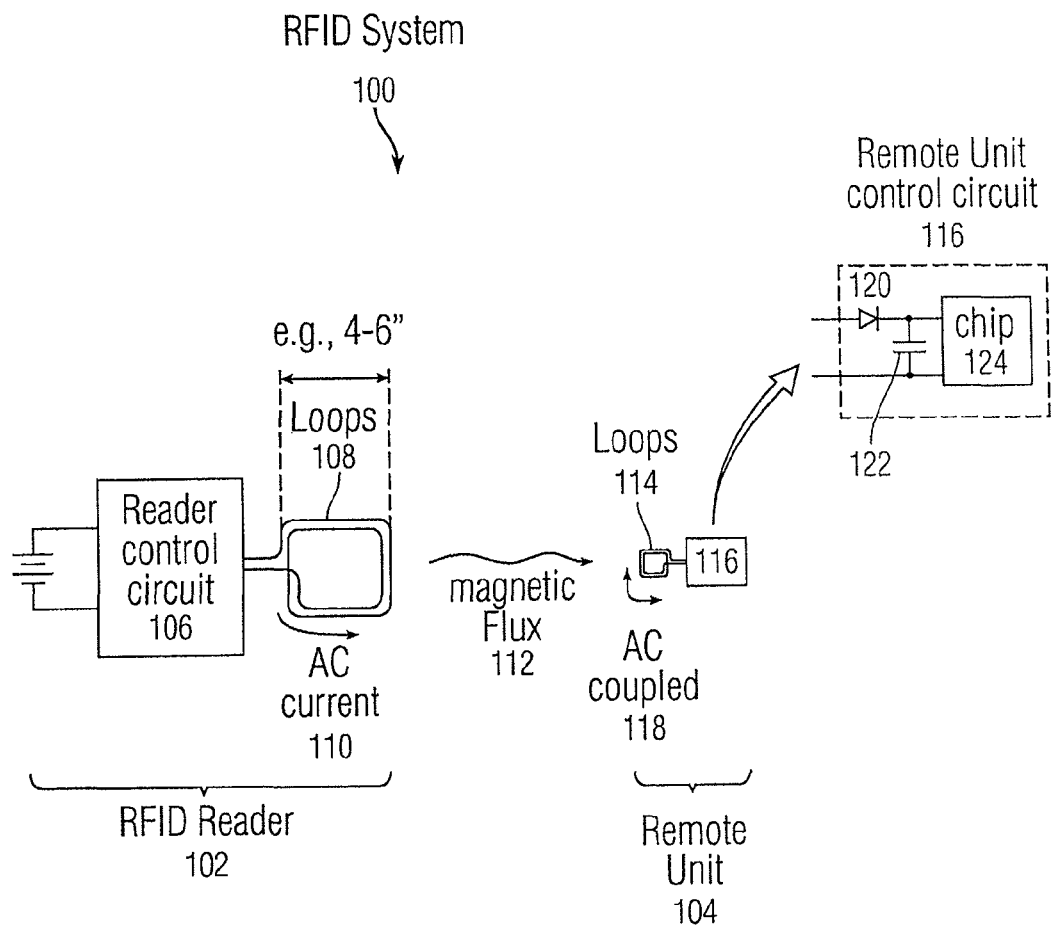
Fig. 1 – PRIOR ART

TOUCH SCREEN RFID TAG READER

FIELD OF THE INVENTION

This relates to radio frequency identification (RFID) systems, and more particularly, to the implementation of RFID capabilities in a handheld multi-touch device.

BACKGROUND OF THE INVENTION

Many types of input devices are presently available for performing operations in a computing system, such as buttons or keys, mice, trackballs, touch sensor panels, joysticks, touch screens and the like. Touch screens, in particular, are becoming increasingly popular because of their ease and versatility of operation as well as their declining price. Touch screens can include a touch sensor panel, which can be a clear panel with a touch-sensitive surface, and a display device that can be positioned behind the panel so that the touch-sensitive surface can substantially cover the viewable area of the display device. Touch screens can allow a user to perform various functions by touching the touch sensor panel using a finger, stylus or other object at a location dictated by a user interface (UI) being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

Touch sensor panels can be formed from a matrix of row and column traces, with sensors or pixels present where the rows and columns cross over each other while being separated by a dielectric material. Touch sensors can also be arranged in any number of dimensions and orientations, including diagonal, concentric circle, and three-dimensional and random orientations. In order to scan a touch sensor panel driven by multiple stimulation frequencies and compute an image of touch, various phases of selected low noise frequencies can be used to simultaneously stimulate the rows of the touch sensor panel, and multiple mixers can be configured to demodulate the signals received from the columns using the selected low noise frequencies. The demodulated signals from the multiple mixers, representing touch output values, can be used in calculations to determine an image of touch for the touch sensor panel at each frequency.

Touch sensor panels can be capable of detecting either single-touch events or multiple touch events, which are described in Applicant's co-pending U.S. application Ser. No. 11/649,998 entitled "Proximity and Multi-Touch Sensor Detection and Demodulation," filed on Jan. 3, 2007, the contents of which are incorporated by reference herein.

RFID technology is becoming more and more prevalent in today's society. The technology can be advantageous because small, minimally invasive, unpowered remote units such as "RFID tags" can be unobtrusively placed in many items to identify them and provide information. Because these REID tags operate without batteries or physical connections to other circuits, little or no maintenance is necessary. However, the base stations (BSs) or "RFID readers" needed to communicate with the RFID tags do require power and a larger "footprint," and are thus more difficult to integrate into various items.

SUMMARY OF THE INVENTION

This relates to the efficient incorporation of RFID circuitry, either reader or remote unit circuitry or both, and in particular the RFID antenna, within touch sensor panel circuitry. In particular, the RFID antenna can be placed in the touch sensor panel, such that the touch sensor panel can now additionally function as an RFID transponder. In this manner, no separate space-consuming RFID antenna is necessary.

In one embodiment, loops (single or multiple) forming the loop antenna of the RFID circuit (for either reader or tag applications) can be formed from metal on the same layer as metal traces formed in the borders of a substrate. The metal traces are used for routing sense or drive lines of the touch sensor panel to one edge of the substrate so that they can be connected to a flex circuit. Forming loops from metal on the same layer as the metal traces can be advantageous in that the loops can be formed during the same processing step as the metal traces, without requiring a separate metal layer. Conductive material other than metal could be used as well.

In other embodiments, conductors formed in the shape of loops and normally provided for other functions can be multiplexed to serve as the loop antenna when the handheld device is in an RFID mode. For example, a loop around the perimeter of a touch sensor panel layer, used primarily for optical uniformity or shielding, can be held at a particular potential or ground during normal use, and multiplexed to transmit or receive AC coupled signals when the RFID circuit is to be used.

In some embodiments, the embedded RFID circuit can be powered by the same power supply that powers the hand-held device incorporating the touch sensor panel. If powered, the embedded RFID circuit can be used as a reader or a tag. In other embodiments, the embedded RFID circuit can be unpowered, and used exclusively as an RFID tag.

BRIEF DESCRIPTION OF THE DRAWINGS

FIG. 1 illustrates an exemplary conventional RFID system, which can include an RFID reader and an RFID tag.

DETAILED DESCRIPTION OF THE PREFERRED EMBODIMENT

Figure 2A:
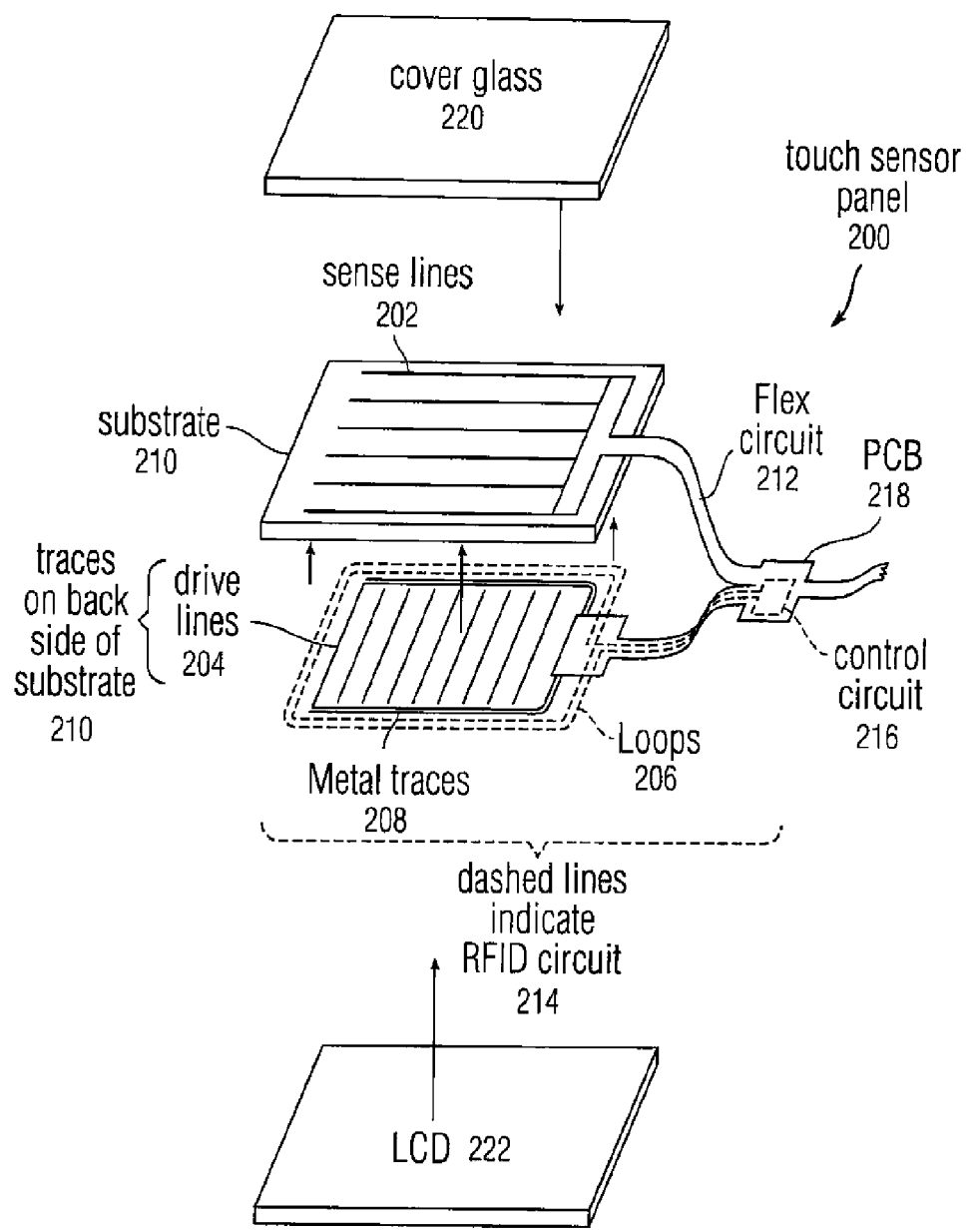
FIG. 2a illustrates an exemplary touch sensor panel having an embedded RFID circuit according to one embodiment of this invention.

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

FIG. 1 illustrates exemplary RFID system 100, which can include RFID reader 102 and remote unit 104 such as an RFID tag. REID reader 102 can include powered reader control circuit 106 connected to one or more reader loops 108 (also referred to herein as coils or loop antennae) of conductive material (i.e. an electromagnetic coil), through which AC current 110 can flow. Reader loops 108 can be on the order of 4-6" in diameter, and can be circular, oval, and the like, although other sizes and shapes are possible. AC current 110 flowing through reader loops 108 can result in the transmitting of magnetic energy or magnetic flux 112 at a various frequencies (e.g. 100 kHz to 20 MHz). The wavelength of the emitted frequencies can be much longer than the size of loops 108 on reader 102.

If remote unit 104 is close enough to RFID reader 102, magnetic flux 112 from the reader can get AC coupled onto one or more remote unit loops 114 of conductive material in the remote unit, which can be an unpowered device (i.e. without a battery or other means of applying continuous power) having an electromagnetic coil and remote unit control circuit 116. Oscillating AC current 118 flowing in alternating directions in remote unit control circuit 116 in remote unit 104 can be rectified by rectifying diode 120 in the remote unit control circuit, which can cause a voltage to be built up across bypass capacitor 122 in the remote unit control circuit. Once bypass capacitor 122 has built up a sufficient voltage, chip 124 in remote unit control circuit 116 can become powered up and operational. By receiving coupled and modulated AC signal 118 from reader 102, chip 124 can receive and detect information (e.g. commands) from the RFID reader.

Once operational, chip 124 can also send signals back to RFID reader 102 by changing the impedance seen by remote unit loops 114. This can be accomplished by shunting or opening remote unit loops 114 with effectively a switch. If remote unit 104 is close enough to reader 102, the modulated electromagnetic field generated by remote unit loops 114 in the remote unit can be coupled back onto reader loops 108 of the RFID reader. The signals sent back to the REID reader can be slow and on the order of 100 bits of data, and provide information back to reader 102 such as the serial number or model number of the device to which the remote unit is attached, credit card number, personal identification information, security codes and passwords, and the like.

Further details on RFID technology are described in "RFID Handbook: Fundamentals and Applications in Contactless Smart Cards and Identification" by Klaus Finkenzoeller, John Wiley & Sons, Ltd., 2003, the contents of which are incorporated by reference herein.

Embodiments of the invention relate to the efficient incorporation of RFID circuitry, either reader or remote unit circuitry or both, and in particular the RFID antenna, within touch sensor panel circuitry.

Touch sensor panels can have sense and drive lines separated by a dielectric, with mutual capacitance sensors formed at the crossover points of the sense and drive lines. The sense and drive lines can be formed on different substrates (where one of the substrates can be a cover), on opposite sides of the same substrate, or on the same side of the same substrate. The sense and drive lines can be formed from conductive material such as Indium Tin Oxide, although other conductive materials can also be used. Because the sense and drive lines can be oriented perpendicular to each other, in some embodiments metal traces connected to either the sense or drive lines can be routed along the border of the substrate to bring all connections to one edge of the substrate. Exemplary touch sensor panel stackups that can incorporate RFID circuitry according to embodiments of the present invention are disclosed in Applicant's co-pending U.S. application Ser. No. 11/818,394 entitled "PET-Based Touchpad," filed on Jun. 13, 2007, U.S. application Ser. No. 11/818,395 entitled "Touch Screen Stack-ups," filed on Jun. 13, 2007, U.S. application Ser. No. 11/818,335 entitled "Touch Screen Stack-up Processing," filed on Jun. 13, 2007, and U.S. application Ser. No. 11/818,498 entitled "Touch Sensitive Display," filed on Jun. 13, 2007, the contents of all which are incorporated by reference herein.

In embodiments of the invention, the RFID antenna can be placed in the touch sensor panel, such that the touch sensor panel can now additionally function as an RFID transponder. In this manner, no separate space-consuming RFID antenna is necessary.

FIG. 2a illustrates exemplary touch sensor panel 200 having embedded RFID circuit 214 according to embodiments of the invention. Embedded RFID circuit 214 performs the function of a remote unit, and can include loops 206 and control circuit 216. RFID circuit 214 can be either a reader or a tag, or both. In the example of FIG. 2a, touch sensor panel 200 is formed from sense lines 202 and drive lines 204 on opposite sides of substrate 210. Cover glass 220 protects substrate 210 and provides the primary touch-sensitive surface. When the drive and sense lines are made from Indium Tin Oxide (ITO), this stackup can be referred to as double-sided ITO (DITO).

In one embodiment, loops 206 (single or multiple) forming the loop antenna of the RFID circuit (for either reader or tag applications) can be formed from metal on the same layer as metal traces 208 in the borders of substrate 210. Metal traces 208 are used for connecting drive lines 204 to flex circuit 212. The connections to drive lines 204 can be brought onto touch sensor panel 200 through flex circuit 212. Loops 206 and metal traces 208 can be located on the same side of the substrate as drive lines 204. Forming loops 206 from metal on the same layer as metal traces 208 can be advantageous in that the loops can be formed during the same processing step as the metal traces, without requiring a separate metal layer. Conductive material other than metal could be used as well.

Although the example of FIG. 2a shows loops 206 formed on the same side of DITO substrate 210 as drive lines 204 for purposes of illustration only, the loops can be formed on the same side of the substrate as the drive line layer in embodiments where the drive and sense lines are formed on different substrates, or on the back of cover glass 220. In still further embodiments, loops 206 can be formed on other sides of the substrates, such as the on the same side of the substrate as sense lines 202. In such an embodiment, the metal traces can be used to connect the sense lines to the flex circuit.

Control circuit 216 can be located on the same flex circuit printed circuit board (PCB) 218 as the other touch sensor panel circuitry, or on a separate PCB altogether.

In some embodiments, embedded RFID circuit 214 can be powered by the same power supply that powers the hand-held device incorporating the touch sensor panel. If powered, embedded RFID circuit 214 can be used as a reader or a tag. In other embodiments, embedded RFID circuit 214 can be unpowered, and used exclusively as an RFID tag.

In one embodiment, a handheld device containing embedded RFID circuit 214 can act as a reader configured to read RFID tags affixed to items in a store. After reading the RFID tag to identify an item, the handheld device can then access the Internet or the store's intranet to get price and other information such as product specifications and the like. In this manner, price and other information can be updated by the store as needed. Alternatively, the RFID tag can simply provide fixed price and other information to the reader.

In another embodiment, the handheld device can act as an RFID tag configured to provide information to an RFID reader. This embodiment can include a badge reader function, where a user can simply swipe the handheld device close to an RFID reader to gain access to a building, room, file cabinet, desk drawer, computer, workstation, copy machine, facsimile machine, and the like. In another embodiment, the handheld device can be a remote unit configured to be used as a credit, debit or gift card, so that the device can be used to pay for items, services, train or subway fares, etc. at gates, vending machines, and the like.

In yet another embodiment, the handheld device can be used at different times as both an RFID reader and an RFID tag. For example, two devices can be used in close proximity to exchange information such as contact information. One handheld device can be set to a receive mode, where embedded RFID circuit 214 can be configured as an RFID reader to initially drive the RFID reader's loop antenna to generate magnetic flux. The other handheld device can be set to a transmit mode, where embedded RFID circuit 214 can be configured as an RFID tag to initially receive magnetic flux, and when sufficiently energized, transmit information such as contact information back to the RFID reader. The configuration can be performed by the users of the handheld devices, and upon configuration of the devices, the devices can additionally exchange handshaking or other control signals prior to transmitting and receiving the desired information.

In other embodiments, conductors formed in the shape of loops and normally provided for other functions can be multiplexed to serve as the loop antenna when the handheld device is in an RFID mode. For example, a loop around the perimeter of a touch sensor panel layer, used primarily for optical uniformity or shielding, can be held at a particular potential or ground during normal use, and multiplexed to transmit or receive AC coupled signals when the RFID circuit is to be used.

Figure 2B:
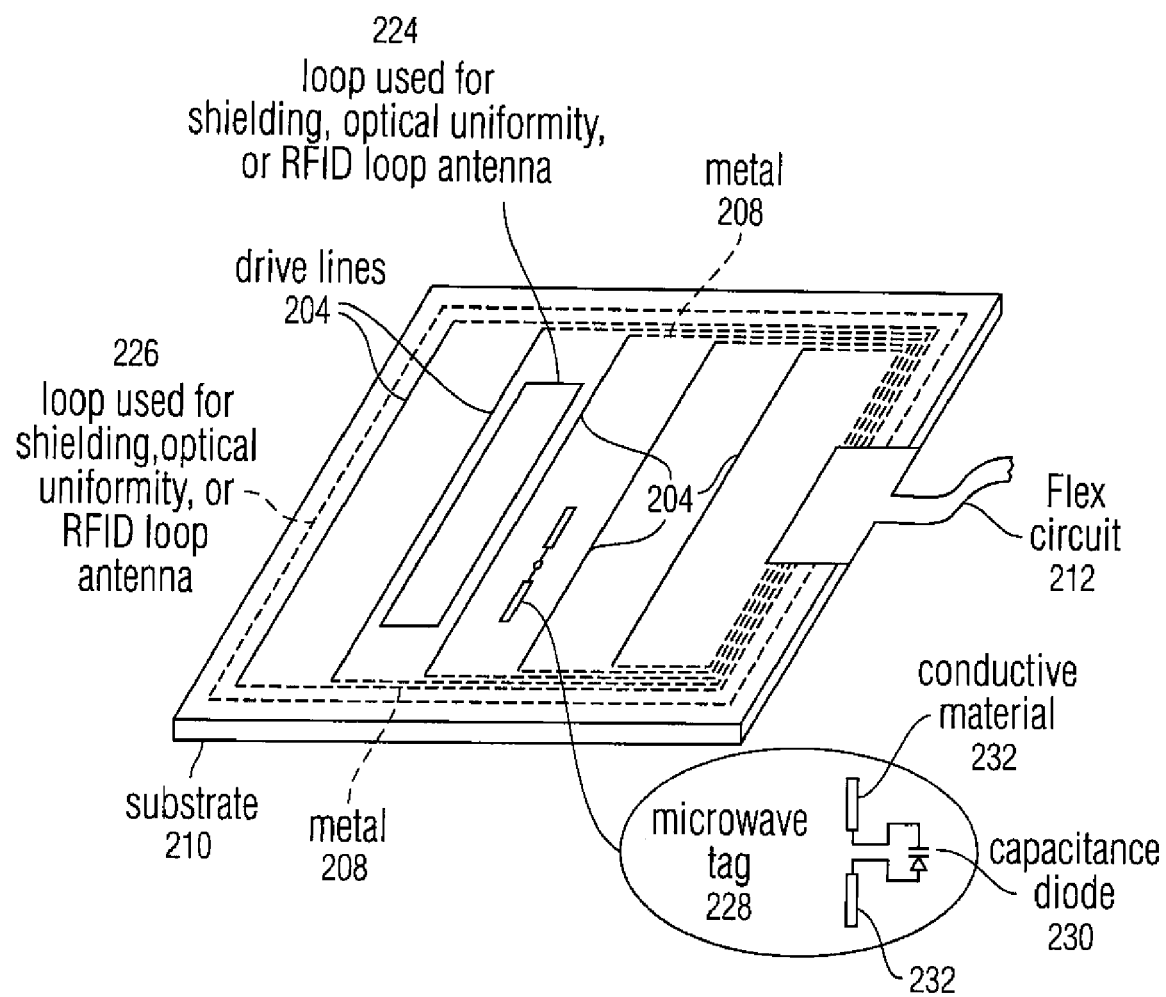
FIG. 2b illustrates several exemplary loops formed on the same side of a substrate as the drive lines that can serve as RFID loops according to embodiments of the invention.

FIG. 2b illustrates several exemplary loops formed on the same side of substrate 210 as the drive lines that can serve as RFID loops according to embodiments of the invention. In FIG. 2b, drive lines 204 formed from a conductive material such as ITO are connected to flex circuit 212 through metal traces 208 formed in the border areas of the substrate. In one embodiment, loops formed by a sense line 204 and its connected metal traces 208 can be multiplexed such that during a panel scan mode, the sense lines are used for panel scanning, but during an RFID mode, the sense lines form part of a loop antenna. Alternatively, conductive material 224 such as ITO used for shielding the sense lines (not shown) from electromagnetic noise from the LCD or optical uniformity can be multiplexed to function as a loop antenna during the REID mode. In addition, metal loops 226 around the perimeter of the substrate used for shielding or optical uniformity can also be multiplexed to function as a loop antenna during the RFID mode.

Electronic article surveillance (EAS) systems can operate in the microwave range and use capacitance dipoles, which are electrodes coupled to nonlinear circuit elements. Accordingly, in alternative embodiments of the invention operating at microwave frequencies, instead of a continuous loop antenna, the RFID loops can be replaced with two patches (the two patches representing a dipole antenna, connected together with a capacitance diode) on one of the touch sensor panel layers. The two patches can perform both a receive and transmit function, while the capacitance diode can perform a crude control circuit function. RFID tags formed in this manner may only be able to relay back the existence of the tag in the form of a signal at the frequency of the second harmonic of the transmitted frequency. In addition, because the desired wavelength is a quarter wave, the frequency range of the RFID reader for RFID tags in the microwave range needs to be in the hundreds of MHz to GHz range.

FIG. 2b also illustrates exemplary microwave RFID tag 228 formed on the same side of substrate 210 as the drive lines according to embodiments of the invention. RFID tag 228 is formed from two patches of conductive material 232 such as ITO, and capacitance diode 230. Conductive material 232 can provide optical uniformity when not used as a microwave RFID tag.

Referring again to FIG. 2a, embedded RFID circuit 214 according to embodiments of the invention resides in close proximity to or integral with touch sensor panel 200, which is utilized when the touch sensor panel is being scanned to generate an image of touch. Embedded RFID circuitry 214 can also reside in close proximity to liquid crystal display (LCD) 222 that can be located adjacent to and underneath touch sensor panel 200. It can be desirable to limit the interference and maximize the interoperability of touch sensor panel 200, LCD 222, and RFID circuit 214. By limiting interference, the accuracy of touch sensor panel 200 and RFID circuit 214 and the performance of LCD 222 can be maximized.

Figure 3:
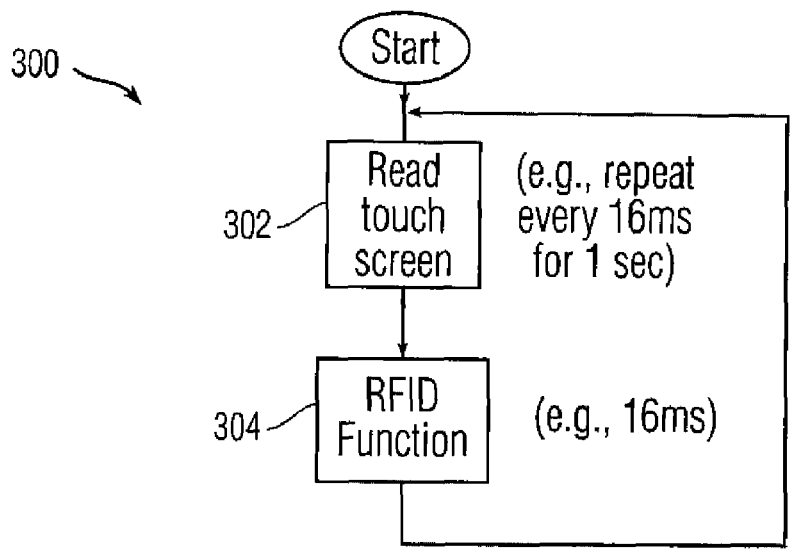
FIG. 3 is a flow diagram illustrating an exemplary time multiplexing of the touch sensor panel and RFID circuit according to one embodiment of this invention.

FIG. 3 is a flow diagram 300 illustrating an exemplary time multiplexing of the touch sensor panel and RFID circuit according to embodiments of the invention. In the example of FIG. 3, under control of one or more processors in a computing system incorporating the touch sensor panel, the touch sensor panel is first repeatedly scanned every 16 ms for about one second at block 302, followed by an RFID operation which may occur for 16 ms at block 304. It should be understood that these time durations are merely exemplary, and that other time durations and multiplexing orders can be employed.

Figure 4:
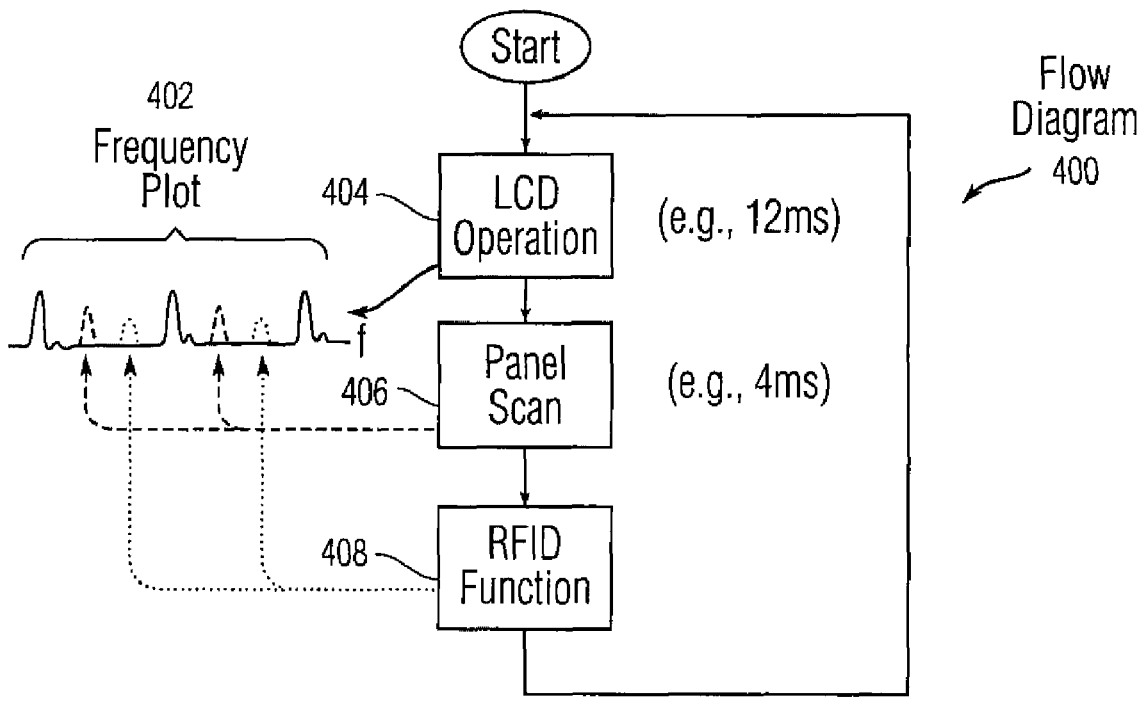
FIG. 4 is a flow diagram and frequency plot illustrating an exemplary time division multiplexing and frequency division multiplexing of the touch sensor panel, LCD, and RFID circuit according to one embodiment of this invention.

FIG. 4 is a flow diagram 400 and frequency plot 402 illustrating an exemplary time division multiplexing and frequency division multiplexing of the touch sensor panel, LCD, and RFID circuit according to embodiments of the invention. In FIG. 4, under control of one or more processors in a computing system incorporating the touch sensor panel, the LCD is first operated for about 12 ms at block 404, followed by scanning of the touch sensor panel for about 4 ms at block 406. Because it can be determined that the LCD can repeatedly produce specific noise patterns at certain frequencies, the touch sensor panel scanning can occur in between the noise spikes caused by the LCD, even though the LCD and panel scan are time multiplexed. Furthermore, because it can be determined that the touch sensor panel scanning can repeatedly produce specific noise patterns at certain frequencies, in one embodiment the RFID circuit can be utilized in between the noise spikes caused by the LCD phase and the touch sensor panel scanning phase at block 408, even though the LCD, panel scan and RFID operations are time multiplexed. In other embodiments, the RFID circuit can be made operational during either the LCD phase or the panel scan phase or both, as long as it avoids the noise spikes created by the LCD and panel scan phases.

In some embodiments, the touch sensor panel scan mode can change its scan rate (frame rate) depending on whether or not a touch is detected. For example, it may take only 8-16 ms to scan the panel during an active mode when touch events are detected, but 40 ms during a "ready mode" occurring after a touch event has been detected after a relatively long period of inactivity. To perform frequency division multiplexing, under control of one or more processors in a computing system incorporating the touch sensor panel, the RFID function can adapt to and avoid noise spikes that change frequency due to changes in the touch sensor panel scanning frequency.

Figure 5:
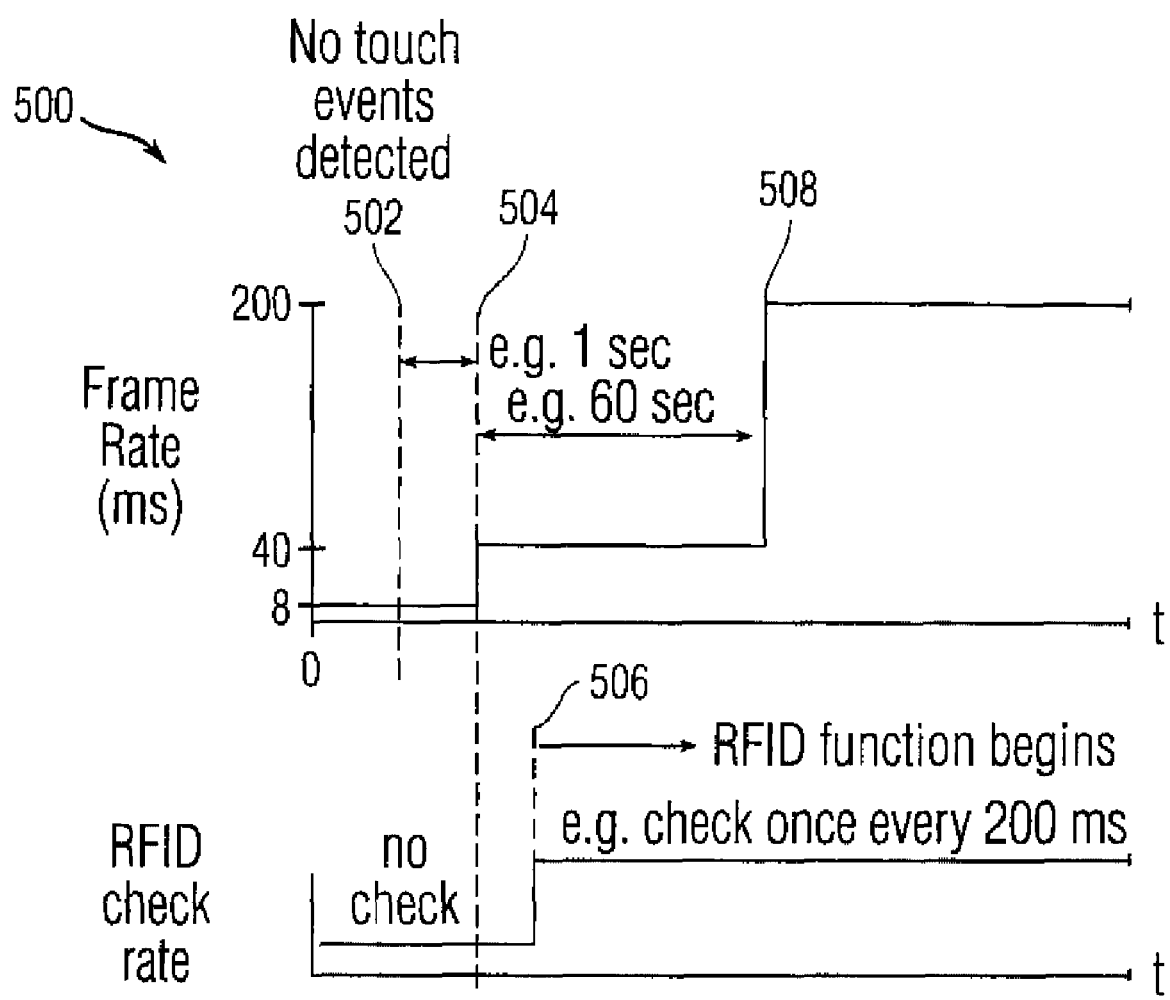
FIG. 5 is a plot of frame rate versus time, illustrating an exemplary change in the frame rate of a panel scan over time and how the RFID function can become operational at the proper time according to one embodiment of this invention.

FIG. 5 is a plot 500 of frame rate versus time, illustrating an exemplary change in the frame rate of a panel scan over time and how the RFID function can become operational at the proper time according to embodiments of the invention. In the example of FIG. 5, at time zero when touch events are being detected, the frame rate is 8 ms. When touch events are no longer detected at 502, a period of one second elapses before the frame rate (the time it takes to scan an entire panel) slows down to once every 40 ms at 504. After the frame rate slows to 40 ms, the RFID function begins at 506, and the RFID check rate commences at about once every 200 ms. At about 60 seconds after the frame rate slows to 40 ms, at 508, the frame rate slows even more, to once every 200 ms. Note that all of the time periods described above are for purposes of illustration only. In yet another embodiment, the RFID check may be manually triggered by a user using buttons, etc.

Figure 6:
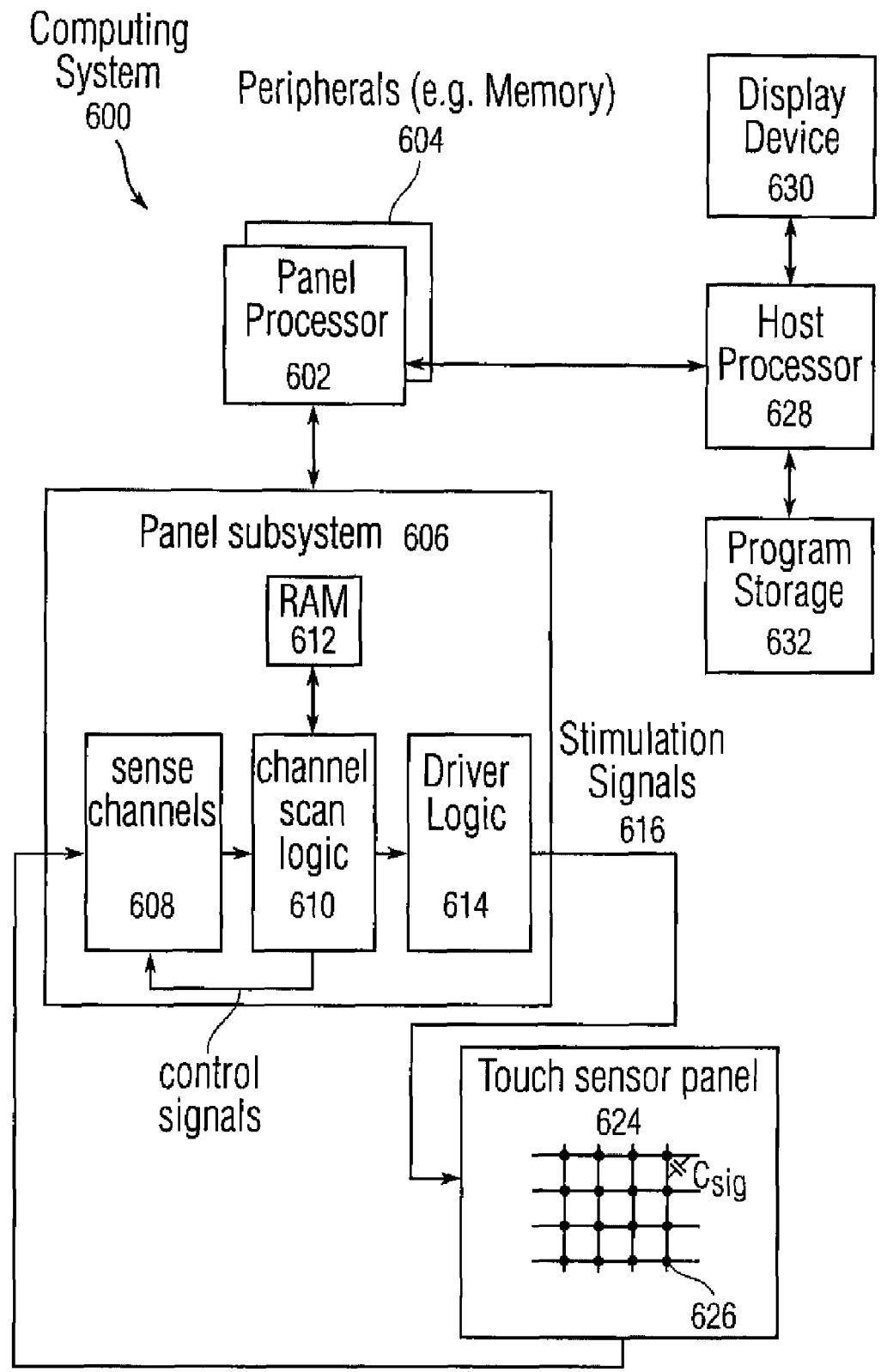
FIG. 6 illustrates an exemplary computing system that can include an RFID reader or tag according to one embodiment of this invention.

FIG. 6 illustrates exemplary computing system 600 that can include one or more of the embodiments of the invention described above. Computing system 600 can include one or more panel processors 602 and peripherals 604, and panel subsystem 606. Peripherals 604 can include, but are not limited to, random access memory (RAM) or other types of memory or storage, watchdog timers and the like. Panel subsystem 606 can include, but is not limited to, one or more sense channels 608, channel scan logic 610 and driver logic 614. Channel scan logic 610 can access RAM 612, autonomously read data from the sense channels and provide control for the sense channels. In addition, channel scan logic 610 can control driver logic 614 to generate stimulation signals 616 at various frequencies and phases that can be selectively applied to rows of touch sensor panel 624. In some embodiments, panel subsystem 606, panel processor 602 and peripherals 604 can be integrated into a single application specific integrated circuit (ASIC).

Touch sensor panel 624 can include a capacitive sensing medium having a plurality of row traces or driving lines and a plurality of column traces or sensing lines, although other sensing media can also be used. Each intersection of drive and sense lines can represent a capacitive sensing node and can be viewed as picture element (pixel) 626, which can be particularly useful when touch sensor panel 624 is viewed as capturing an "image" of touch. (In other words, after panel subsystem 606 has determined whether a touch event has been detected at each touch sensor in the touch sensor panel, the pattern of touch sensors in the multi-touch panel at which a touch event occurred can be viewed as an "image" of touch (e.g. a pattern of fingers touching the panel).) Each sense line of touch sensor panel 624 can drive sense channel 608 (also referred to herein as an event detection and demodulation circuit) in panel subsystem 606.

Computing system 600 can also include host processor 628 for receiving outputs from panel processor 602 and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 628 can also perform additional functions that may not be related to panel processing, and can be coupled to program storage 632 and display device 630 such as an LCD display for providing a UI to a user of the device.

Note that one or more of the functions described above can be performed by firmware stored in memory (e.g. one of the peripherals 604 in FIG. 6) and executed by panel processor 602, or stored in program storage 632 and executed by host processor 628. The firmware can also be stored and transported within any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain, store, communicate, propagate, or transport the program for use by or in connection with the instruction execution system, apparatus, or device. The computer readable medium can include, but is not limited to, an electronic, magnetic, optical, electromagnetic, infrared, or semiconductor system, apparatus, device, or propagation medium. A computer-readable medium can include, but is not limited to, an electrical connection (electronic) having one or more wires, a portable computer diskette (magnetic), a random access memory (RAM) (magnetic), a read-only memory (ROM) (magnetic), an erasable programmable read-only memory (EPROM) (magnetic), an optical fiber (optical), portable optical disc such a CD, CD-R, CD-RW, DVD, DVD-R, or DVD-RW, or flash memory such as compact flash cards, secured digital cards, USB memory devices, memory sticks, and the like. Note that the computer-readable medium could even be paper or another suitable medium upon which the program is printed, as the program text can be electronically captured via optical scanning of the paper or other medium, then compiled, interpreted or otherwise processed in a suitable manner if necessary, and then stored in a computer memory.

Figure 7A:
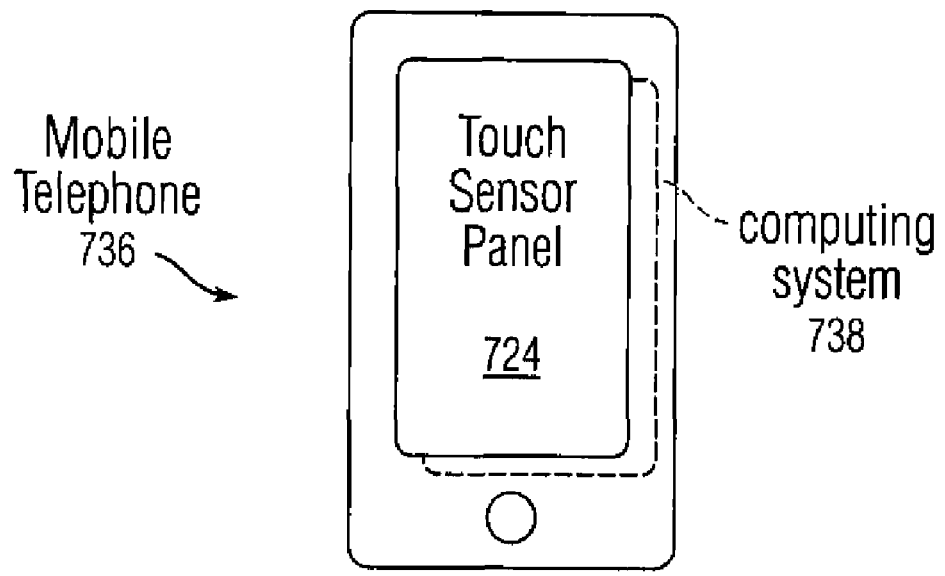
FIG. 7a illustrates an exemplary mobile telephone that can implement RFID functions according to embodiments of the invention.

FIG. 7a illustrates an exemplary mobile telephone 736 that can include touch sensor panel 724 (e.g. touch sensor panel 101 of FIG. 1) and computing system 738 (e.g. computing system 600 of FIG. 6) including firmware stored in memory for performing one or more of the functions described above according to embodiments of the invention.

Figure 7B:
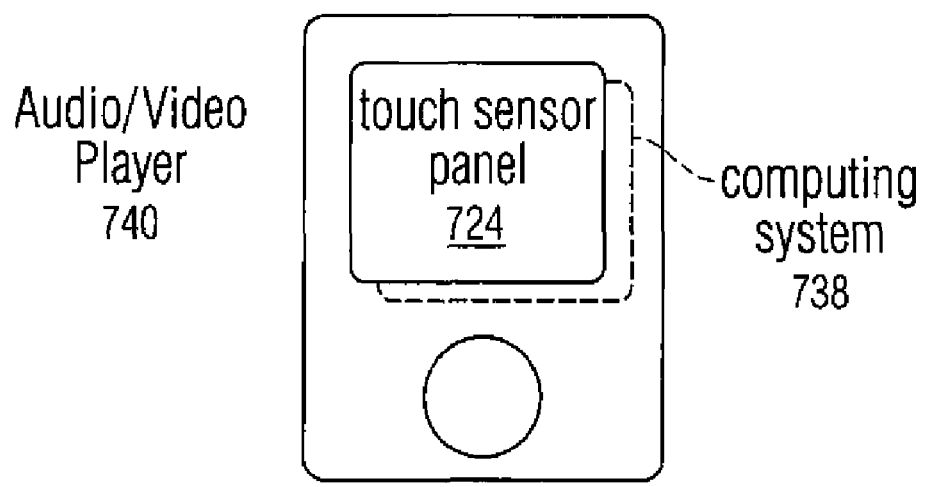
FIG. 7b illustrates an exemplary digital audio player that can implement RFID functions according to embodiments of the invention.

FIG. 7b illustrates an exemplary digital audio/video player 740 that can include touch sensor panel 724 (e.g. touch sensor panel 101 of FIG. 1) and computing system 738 (e.g. computing system 600 of FIG. 6) including firmware stored in memory for performing one or more of the functions described above according to embodiments of the invention.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. An apparatus for providing radio frequency identification (RFID) and touch sensing capability, comprising:
   a touch sensor panel, the touch sensor panel including one or more substrates and a plurality of drive lines and a plurality of sense lines, the plurality of drive lines and the plurality of sense lines formed on one or more of the substrates; and
   an RFID circuit, the RFID circuit including an antenna and a control circuit coupled to the antenna, the antenna formed by conductors multiplexed to perform a first RFID function during a first time period and a second function during a second time period and formed on a same side of the substrate as either the plurality of drive lines or the plurality of sense lines.

2. The apparatus of claim 1, the touch sensor panel further comprising:
   metal traces for connecting either the plurality of drive lines or the plurality of sense lines to a flex circuit;
   wherein the antenna is formed from metal on the same layer as the metal traces.

3. The apparatus of claim 1, further comprising a multiplexer coupled to the antenna for switching the antenna to function as either as an antenna or as an electromagnetic shield.

4. The apparatus of claim 1, the antenna configured for providing optical uniformity.

5. The apparatus of claim 1, the antenna further comprising a loop antenna.

6. The apparatus of claim 1, the antenna further comprising a dipole antenna and the control circuit comprising a capacitance diode.

7. The apparatus of claim 1, the RFID circuit configurable as either an RFID reader or an RFID tag.

8. The apparatus of claim 1, further comprising a processor programmed for time-division multiplexing an operation of the touch sensor panel and the RFID circuit.

9. The apparatus of claim 1, further comprising:
   a liquid crystal display (LCD); and
   a processor programmed for time-division multiplexing an operation of the touch sensor panel, the LCD, and the RFID circuit.

10. The apparatus of claim 1, further comprising:
    a liquid crystal display (LCD); and
    a processor programmed for frequency-division multiplexing an operation of the touch sensor panel, the LCD, and the RFID circuit.

11. A computing system comprising the apparatus of claim 1.

12. A mobile telephone comprising the computing system of claim 11.

13. A digital media player comprising the computing system of claim 11.

14. The apparatus of claim 1, wherein the second function is chosen from the group consisting of scanning the touch sensor panel, shielding the sense lines from electromagnetic noise, and providing optical uniformity.

15. A method for providing radio frequency identification (RFID) functionality on a touch sensor panel, comprising:
    forming a plurality of drive lines and a plurality of sense lines on one or more substrates of the touch sensor panel, the plurality of drive lines and the plurality of sense lines providing touch sensing capability; and
    forming an RFID circuit including an antenna and a control circuit coupled to the antenna on a substrate of the touch sensor panel, the antenna formed by conductors multiplexed to perform a first RFID function during a first time period and a second function during a second time period and formed on a same side of the substrate as either the plurality of drive lines or the plurality of sense lines.

16. The method of claim 15, further comprising:
    forming metal traces for connecting either the plurality of drive lines or the plurality of sense lines to a flex circuit; and
    forming the antenna from metal on a same layer as the metal traces.

17. The method of claim 15, further comprising switching the antenna to function as either as an antenna or as an electromagnetic shield.

18. The method of claim 15, further comprising forming the antenna from a conductive material that provides optical uniformity.

19. The method of claim 15, further comprising forming the antenna as a loop antenna.

20. The method of claim 15, further comprising forming the antenna as a dipole antenna and the control circuit as a capacitance diode.

21. The method of claim 15, further comprising configuring the RFID circuit as either an RFID reader or an RFID tag.

22. The method of claim 15, further comprising time-division multiplexing an operation of the touch sensor panel and the RFID circuit.

23. The method of claim 15, further comprising time-division multiplexing an operation of the touch sensor panel, a liquid crystal display (LCD), and the RFID circuit.

24. The method of claim 15, further comprising frequency-division multiplexing an operation of the touch sensor panel, a liquid crystal display (LCD), and the RFID circuit.

25. The method of claim 15, wherein the second function is chosen from the group consisting of scanning the touch sensor panel, shielding the sense lines from electromagnetic noise, and providing optical uniformity.

26. A mobile telephone including an apparatus for providing radio frequency identification (RFID) and touch sensing capability, the apparatus comprising:
    a touch sensor panel, the touch sensor panel including one or more substrates and a plurality of drive lines and a plurality of sense lines, the plurality of drive lines and the plurality of sense lines formed on one or more of the substrates; and
    an RFID circuit, the RFID circuit including an antenna and a control circuit coupled to the antenna, the antenna formed by conductors multiplexed to perform a first RFID function during a first time period and a second function during a second time period and formed on a same side of the substrate as either the plurality of drive lines or the plurality of sense lines.

27. A digital audio player including an apparatus for providing radio frequency identification (RFID) and touch sensing capability, the apparatus comprising:
    a touch sensor panel, the touch sensor panel including one or more substrates and a plurality of drive lines and a plurality of sense lines, the plurality of drive lines and the plurality of sense lines formed on one or more of the substrates; and
    an RFID circuit, the RFID circuit including an antenna and a control circuit coupled to the antenna, the antenna formed by conductors multiplexed to perform a first RFID function during a first time period and a second function during a second time period and formed on a same side of the substrate as either the plurality of drive lines or the plurality of sense lines.

* * * * *

UNITED STATES PATENT AND TRADEMARK OFFICE
CERTIFICATE OF CORRECTION

| | |
|---|---|
| PATENT NO. | : 7,928,965 B2 |
| APPLICATION NO. | : 11/965560 |
| DATED | : April 19, 2011 |
| INVENTOR(S) | : Michael Nathaniel Rosenblatt et al. |

It is certified that error appears in the above-identified patent and that said Letters Patent is hereby corrected as shown below:

In column 1, line 56, delete "REID" and insert -- RFID --, therefor.

In column 3 line 8, delete "REID" and insert -- RFID --, therefor.

In column 3, line 43, delete "REID" and insert -- RFID --, therefor.

In column 3, lines 51-52, delete "Finkenzoeller," and insert -- Finkenzeller, --, therefor.

In column 5, line 53, delete "REID" and insert -- RFID --, therefor.

Signed and Sealed this
Twenty-ninth Day of November, 2011

David J. Kappos
*Director of the United States Patent and Trademark Office*